United States Patent [19]
Parady

[11] Patent Number: 6,115,756
[45] Date of Patent: *Sep. 5, 2000

[54] ELECTRO-OPTICALLY CONNECTED MULTIPROCESSOR AND MULTIRING CONFIGURATION FOR DYNAMICALLY ALLOCATING TIME

[75] Inventor: Bodo K. Parady, Danville, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/883,862

[22] Filed: Jun. 27, 1997

[51] Int. Cl.[7] ............................ G06F 15/16; G06F 15/173
[52] U.S. Cl. ........................ 709/251; 709/229; 709/218; 709/224; 709/250; 370/258; 370/252; 370/366; 370/386; 370/362; 370/396; 370/249; 370/465; 395/739
[58] Field of Search .............................. 395/739; 710/24, 710/112, 69, 108; 709/238, 224, 250, 251, 229, 210; 370/258, 366.86, 252, 362, 396, 249, 465, 516, 222.23, 450, 386, 403.07; 348/15

[56] References Cited

U.S. PATENT DOCUMENTS

| | | | |
|---|---|---|---|
| 4,383,315 | 5/1983 | Torng | 370/89 |
| 4,539,679 | 9/1985 | Bux et al. | 370/88 |
| 4,680,756 | 7/1987 | Sugimoto et al. | 370/88 |
| 4,725,834 | 2/1988 | Chang et al. | 340/825.5 |
| 4,750,109 | 6/1988 | Kita | 709/227 |
| 4,807,118 | 2/1989 | Lin et al. | 709/237 |
| 4,922,408 | 5/1990 | Davis et al. | 709/252 |
| 5,055,999 | 10/1991 | Frank et al. | 711/163 |
| 5,282,199 | 1/1994 | Herzberg et al. | 370/85.14 |
| 5,341,483 | 8/1994 | Frank et al. | 711/206 |
| 5,351,043 | 9/1994 | Hullett et al. | 340/825.5 |
| 5,463,624 | 10/1995 | Hogg et al. | 370/85.6 |
| 5,467,351 | 11/1995 | Baumert | 370/85.15 |
| 5,469,434 | 11/1995 | Kurdzo et al. | 370/67 |
| 5,495,481 | 2/1996 | Duckwall | 370/462 |
| 5,506,961 | 4/1996 | Carlson et al. | 713/200 |
| 5,544,330 | 8/1996 | Bither et al. | 395/280 |
| 5,548,728 | 8/1996 | Danknick | 709/213 |
| 5,592,486 | 1/1997 | Lo et al. | 370/389 |
| 5,787,264 | 7/1998 | Christiansen et al. | 395/293 |
| 5,809,021 | 9/1998 | Diaz et al. | 370/364 |
| 5,835,491 | 11/1998 | Davis et al. | 370/386 |
| 5,862,136 | 1/1999 | Irwin | 370/395 |

OTHER PUBLICATIONS

Dijkstra, E.W., "Solution of a Problem in Concurrent Programming Control," Communications of the ACM, vol. 8, No. 9, Sep., 1965, p. 569.

Gustavson, David B., "The Scalable Coherent Interface and Related Standards Projects," IEEE Micro, 1992, p. 10.

*Primary Examiner*—Le Hien Luu
*Assistant Examiner*—Beatriz Prieto
*Attorney, Agent, or Firm*—Conley, Rose & Tayon, P.C.; Lawrence J. Merkel; B. Noel Kivlin

[57] ABSTRACT

A computer system employs a hierarchical ring structure for communication. Computer system elements are configured into modules with ring interface hardware, and the modules are coupled to one or more rings. Bridge modules may be included for transmitting between rings in the hierarchy. The rings are time division multiplexed, and each time slot on a ring carries a frame. According to an address carried within the frame, bridge modules determine whether or not to transmit a frame circulating on a source ring onto a target ring. If the address of the frame indicates a module upon the source ring, the bridge module retransmits the frame on the source ring. Otherwise, the bridge module transmits the frame on the target ring. The bridge module operates in this fashion at any level of the hierarchy. The owner of a time slot on a ring is permitted to release the time slot for use by other modules. To reclaim a time slot, the owner marks the time slot owned. The module using the time slot, upon detecting the owned mark, removes the frame from the time slot and responds with a null frame. If a module detects a frame to which that module is to respond but the module's buffer is full, the module may retransmit the frame upon the source ring. The time slot carrying the frame effectively serves as a queue position. According to one embodiment, rings comprise optical links.

17 Claims, 12 Drawing Sheets

| Operation Type | Address/Data Field 1 | Address/Data Field 2 |
|---|---|---|
| Read Near Request | Address 1 | Address 2 |
| Read Near Reply | Data 1 | Data 2 |
| Read Far Request | Address | Return Address |
| Read Far Reply | Return Address | Data |
| Write | Address | Data |
| Atomic Request | Address | Data |
| Atomic Reply | Address | Data |
| Read Chain - Frame 1 | Address | Size and Return Address |
| Read Chain - Other Frames | Data | Data |
| Write Chain - Frame 1 | Target Address | Source Address |
| Write Chain - Other Frames | Data | Data |

FIG. 4

| Control Field | Transaction |
|---|---|
| 000 | Null |
| 001 | Read |
| 010 | Write |
| 011 | Atomic |
| 100 | End Read Chain |
| 101 | Read Chain |
| 110 | Write Chain |
| 111 | End Write Chain |

ELECTRO-OPTICALLY CONNECTED MULTIPROCESSOR AND MULTIRING CONFIGURATION FOR DYNAMICALLY ALLOCATING TIME

BACKGROUND OF THE INVENTION

1. Field of the Invention

This invention is related to the field of computer systems and, more particularly, to interconnecting multiple microprocessors within a computer system.

2. Description of the Related Art

Computer systems have been achieving increased performance through the increasing performance of the microprocessors included therein and through including multiple microprocessors. As performance has increased, the applications to which these computer systems may be applied has increased as well. Applications which were formerly allocated to mainframe-style computers may now be performed using less expensive workstations. Furthermore, applications which were formerly unachievable in computer systems are now achievable. Continued advances in computer system performance are desirable to make yet additional applications achievable and to improve the efficiency at which current applications are performed.

As the microprocessors included in computer systems have increased in performance (through microarchitectural improvements and increased operating frequencies made possible by advances in semiconductor fabrication technologies), the bandwidth requirements of the microprocessors have increased as well. The increased numbers of instructions executed per second and the increased amount of data processed per second lead directly to bandwidth increases. Multiprocessor configurations increase the bandwidth requirements as a function of the number of processors included in the configuration.

Computer systems typically employ a bus structure for interconnecting microprocessors, memory, input/output (I/O) devices, and other features. The bus structure may be hierarchical, in which a bridge is included for conveying transactions between the hierarchical levels. Unfortunately, the bandwidth available from a bus structure is becoming insufficient for serving the requirements of modern microprocessors, memory, I/O devices, etc. Generally, a bus structure comprises a shared set of communication lines (the "bus") at each level of the bus hierarchy. The devices provided at each level attach to the bus. Access to the bus is typically controlled through an arbitration scheme. For example, a round-robin scheme may be used in which each requesting device is eventually allowed an opportunity to control the bus. Alternatively, a fixed priority scheme may be used in which the highest priority requestor is allowed to control the bus. Unfortunately, the time elapsing during arbitration for the bus increases the latency of the bus for any given requester. The requester must arbitrate for control of the bus before transmitting a transaction upon the bus.

Additionally, because the bus at any level in the hierarchy is a shared resource, only one device may initiate a transaction at any given time. Therefore, the bandwidth available to any given bus master is a fraction of the total bandwidth available on the bus. The fraction depends upon how frequently the bus is granted to the given master as compared to other masters on the bus. Yet another problem associated with bus structures is the need for large queues for bus transactions, particularly in the bridge devices between bus levels. If a bus transaction is presented and the queue within the receiver of the transaction is full, then the transaction must be retried back to the master of the transaction. The master must then attempt the transaction again later. If the master is a bridge device, it must retain the queue position for the transaction until it is successfully presented upon the target bus. In order to reduce the number of times the queue is full, a relatively large number of queue positions may be implemented.

One way to increase bandwidth on a bus is to increase its width. More data may be transferred per bus cycle, thereby increasing the overall available bandwidth. Unfortunately, wider buses are more expensive. Costs may be increased by increasing the number of layers of PCB board needed to route the larger number of lines between the various devices attached to the bus. Furthermore, connectors for attaching removable devices to the bus must become larger. The line width of the conductors is limited by impedance considerations as well as board fabrication technologies. Line spacing is affected by the fabrication technologies as well as by electrical cross-coupling tendencies.

Another way to increase bandwidth on a bus is to increase the operating frequency of the bus. Typically, a bus uses electrical signalling techniques. Electrical signalling techniques are beginning to reach physical limitations in modern computer systems. As bus frequencies increase, the length of the bus conductors becomes a problem. Essentially, the longer conductors become antennae which broadcast the signals being conveyed thereon. Cross coupling between bus conductors increases, and the electro-magnetic interference (EMI) produced may exceed FCC specifications. Solving the cross-coupling and EMI problems can be an extremely expensive and time-consuming activity. Still further, as frequencies are increased the bus conductors are increasingly dominated by transmission line effects. The transmission line effects limit the frequency at which a particular bus may operate. An additional problem with high frequency buses is that differential signalling often must be employed. Each bus signal requires a pair of conductors when differential signalling is employed, increasing the overall number of conductors and thereby incurring the problems with wider busses discussed above.

SUMMARY OF THE INVENTION

The problems outlined above are in large part solved by a computer system in accordance with the present invention. The computer system employs a hierarchical ring structure for high frequency communication between devices included therein. Computer system elements (such as microprocessors, memory, etc.) are configured into modules with ring interface hardware, and the modules are coupled to one or more rings. Bridge modules may be included for transmitting between rings in the hierarchy. The rings are time division multiplexed, and each time slot on a ring carries a frame. According to an address carried within the frame, bridge modules determine whether or not to transmit a frame circulating on a source ring onto a target ring. The target ring may be higher or lower in the hierarchy than the source ring. If the address of the frame indicates a module upon the source ring, the bridge module retransmits the frame on the source ring. Otherwise, the bridge module transmits the frame on the target ring. The bridge module operates in this fashion at any level of the hierarchy. Advantageously, a simple and rapid protocol for transmitting frames is replicated at each level of the ring hierarchy. Because an address masking and match operation may be performed quickly, a short ring transmit time may be maintained at any ring level. Therefore, intra-ring transfers may be performed rapidly, providing high bandwidth communication.

Since time slots are assigned to modules upon a given ring, each module is provided bandwidth without requiring arbitration. Advantageously, time spent arbitrating for access is eliminated from data transfer time. Additionally, the owner of a time slot is permitted to release the time slot for use by other modules, allowing for a module experiencing low data transfer traffic to relinquish bandwidth to a module experiencing high data transfer traffic. The bandwidth available on the ring can thereby be allocated to high traffic modules, and may be fully utilized even when traffic is unevenly dispersed among the modules. The source of a frame in a time slot may be identified via a return address field within the frame. The return address is a local address to the ring, occupying just a few signal lines. Still further, the owner of a time slot can reclaim a released time slot using an arbitrationless signalling protocol. To reclaim a time slot, the owner marks the time slot owned. The module using the time slot, upon detecting the owned mark, removes the frame from the time slot and responds with a null frame. The owner may then use the time slot. Advantageously, arbitration is not required and time slot reclamation may occur in as few as two ring transit times.

The computer system may employ modules which have relatively small buffers (or queues) as compared to bus-based computer systems. If a module detects a frame to which that module is to respond but the module's buffer is full, the module may set a buffer full bit in the frame and retransmit the frame upon the source ring. The buffer full bit serves as an acknowledgment that the frame has been recognized. Additionally, the buffer full bit allows the time slot carrying the frame to effectively serve as a queue position. The source of the frame on the ring cannot place additional frames into the time slot. Therefore, modules control data flow using the time slots instead of larger queues.

According to one embodiment, rings comprise optical links. Using optical signalling techniques, a higher bandwidth ring may be developed. While electrical signalling technologies are reaching their physical limits, optical signalling technologies are not even approaching physical limitations. The ring interface hardware within each module performs optical to electrical conversion, allowing electrical signalling to be used within modules.

Broadly speaking, the present invention contemplates a computer system comprising a first ring, a second ring, and a first bridge module. The first ring is configured to communicate frames among at least two modules coupled to the first ring. Coupled to the first and second rings, the first bridge module is configured to transmit a first frame received from the first ring to the second ring if a first address within the first frame indicates a destination external to the first ring. Furthermore, the first bridge module is configured to transmit a second frame received from the second ring upon the first ring if a second address within the second frame indicates one of the at least two modules coupled to the first ring. The first ring and the second ring both employ a particular protocol for transmitting frames.

The present invention further contemplates a computer system comprising a ring and a first module. The ring is configured to transmit frames between a plurality of modules coupled to the ring. The first module is one of the plurality of modules coupled to the ring. A ring transit time corresponding to the ring is divided into a plurality of time slots, each of which is capable of carrying a frame. A first time slot within the plurality of time slots is assigned to the first module, which is configured to allow a different one of the plurality of modules to use the first time slot by marking a first frame within the first time slot not owned. The first frame includes a return address which identifies which one of the plurality of modules is a source of the first frame.

Moreover, the present invention contemplates a computer system comprising first, second, and third rings and first and second bridge modules. The first ring is configured to communicate frames between a first plurality of modules coupled to the first ring. Similarly, the second ring is configured to communicate frames between a second plurality of modules coupled to the second ring. The first bridge module is coupled between the first ring and the third ring and the second bridge module is coupled between the second ring and the third ring. The first bridge module and the second bridge module are configured to perform a first chain transaction comprising a plurality of frames. The first chain transaction is performed between the first ring and the second ring. The first bridge module is configured to receive a first one of the plurality of frames from one of the first plurality of modules and to record a first return address from the first one of the plurality of frames. The first return address identifies the one of the first plurality of modules within the first ring. Additionally, the first bridge module is configured transmit the first one of the plurality of frames upon the third ring after replacing the first return address with a second return address identifying the first bridge module. The second bridge module is configured to record the second return address whereby remaining ones of the plurality of frames are identified by the second bridge module.

BRIEF DESCRIPTION OF THE DRAWINGS

Other objects and advantages of the invention will become apparent upon reading the following detailed description and upon reference to the accompanying drawings in which:

FIG. 4 is a table illustrating the use of a pair of address/data field shown in FIG. 3 for various types of operations.

Figure 1:
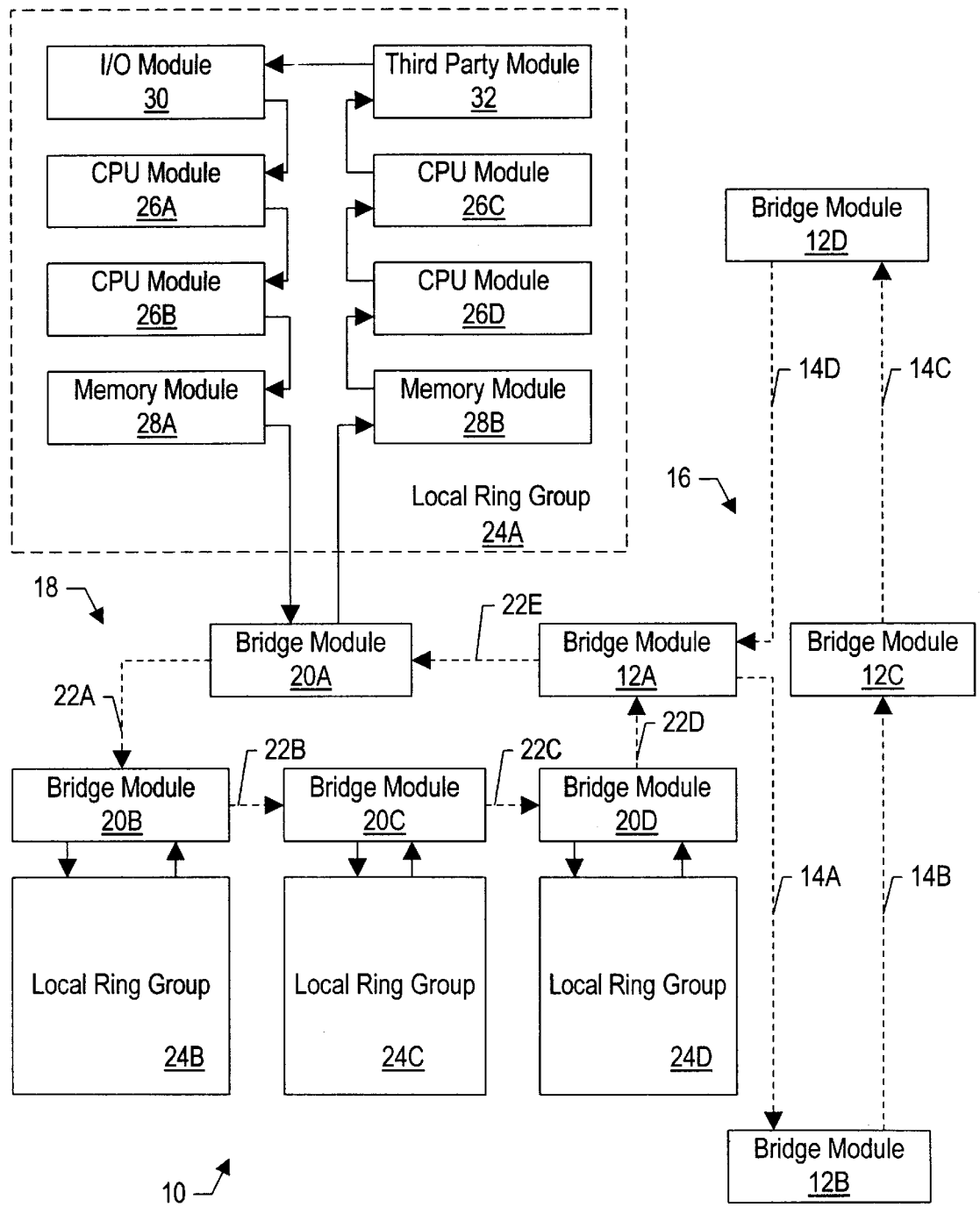
FIG. 1 is a block diagram of one embodiment of a computer system including a plurality of rings in a hierarchical configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a portion of one embodiment of a computer system 10 is shown. Computer system 10 includes a plurality of bridge modules 12A–12D interconnected in a ring illustrated by dot-dashed lines 14A–14D. Taken as a group, lines 14A–14D form a ring generally indicated at 16. Bridge module 12A is additionally coupled into a ring 18 with bridge modules 20A–20D. Ring 18 comprises lines 22A–22E. Bridge modules 12B–12D are similarly coupled into other rings (not shown). Each of bridge modules 20A–20D is coupled into a ring with a corresponding local ring group 24A–24D. One embodiment of local ring group 24A is shown in greater detail in FIG. 1, and other local ring groups 24B–24D may be configured similarly. As shown in FIG. 1, local ring group 24A includes central processing unit (CPU) modules 26A–26D, memory modules 28A–28B, I/O module 30, and third party module 32. Bridge module 20A and the modules illustrated within local ring group 24A are again interconnected in a ring as illustrated by the solid lines between the modules. The number and type of modules included in a local ring group 24A–24D or upon rings 18 and 16 may be varied in various embodiments. Local ring groups 24A–24D, ring 18, and ring 16 have a hierarchical relationship as described below. The number of levels of hierarchy may be varied from 0 (i.e. one ring) to any number of levels in various embodiments.

Generally speaking, computer system 10 employs a hierarchy of rings for transmitting transactions between elements of computer system 10. As used herein, a ring is a communications link between a plurality of modules in which each module forwards frames to one other module upon the ring and receives frames from one other module upon the ring. For example, CPU module 26A receives frames from I/O module 30 and transmits frames to CPU module 26B. Similarly, CPU module 26B receives frames from CPU module 26A and transmits frames to memory module 28A. The devices attached to a ring are connected such that a particular frame originating in a particular module (if not received by any of the modules on the ring) traverses the ring through each module before returning to the source module. A frame may comprise a transaction, or may comprise a portion of a transaction which uses multiple frames. According to one embodiment, the ring transit time (i.e. the amount of delay experienced by a signal from leaving a particular point on the ring and returning to the point on the ring) is time division multiplexed into a plurality of time slots. Each time slot is assigned to a module upon the ring (the "owner" of the time slot). A frame comprises the value conveyed upon the ring during a particular time slot.

Since each module is assigned at least one time slot upon the ring, no arbitration is needed for a module to obtain access to the ring in order to perform a particular transaction. Instead, the module awaits a time slot for which that module is an owner or a not-owned time slot (described further below), and transmits the transaction as a frame within that time slot.

In one embodiment, the links forming each ring are optical links. Generally speaking, an optical link is a link configured to transmit light pulses instead of electrical signals. For example, an optical link may be formulated from polyimide strips or polyguide ribbon cable. Since electrical impedance considerations are eliminated, the polyimide strips can be fabricated much narrower than copper lines on a printed circuit board. Furthermore, the polyimide strips may be spaced more closely because electrical cross-coupling is not an issue. Therefore, a relatively wide bus may be fabricated in the amount of space occupied by a much narrower copper bus. For example, approximately 160 polyimide lines may be fabricated per inch where copper lines may reach a maximum of 10 lines per inch. Using optical links may allow for a much higher frequency implementation of the rings, since the physical limitations of light are not approached at frequencies at which the physical limitations of electrical signalling technologies are a large problem.

For optical link embodiments, each module includes an optical interface section which includes optical drivers and receivers as well as ring control hardware. The optical drivers may comprise vertical cavity surface emitting lasers (VCSELs) available from Siemens Fiber Optics, a unit of Siemens AG, Berlin, Germany, for example. Additionally, each module further includes functionality comprising a computer system feature (e.g. a CPU, a memory, etc.).

Although computer system 10 employs a hierarchy of rings, the protocol employed upon each ring is the same. Time-division-multiplexed time slots are assigned to each module attached to a ring, and those time slots are used by the module to communicate with other modules within a ring. A bridge module 12A–12D or 20A–20D transmits a frame from a source ring (from which the bridge module receives the frame) to a target ring (the other ring to which the bridge module is connected) if the destination of the frame is external to the source ring. The source ring for the bridge module may not be the ring upon which the frame actually originates. Similarly, the target ring may not be the final target of the frame (i.e. the target module may reside upon a different ring, in which case a bridge module upon the target ring may transmit the frame to yet another ring. The bridge module receiving a frame upon a given source ring need not determine if the frame actually originated upon that source ring. The bridge module determines if the frame is to be transmitted onto the target ring (and removed from the source ring) or remains on the source ring. Another bridge module on the source ring may transmit the frame to another target ring (if the source ring is ring 16 or ring 18), or a module upon the source ring may be the target of the frame (e.g. memory module 28A–28B, I/O module 30, or third party module 32).

According to one embodiment, a portion of the addresses used to identify memory locations and I/O modules within computer system 10 (i.e. the address space of computer system 10) identifies the ring upon which the memory or I/O module is located. This portion of the address is referred to herein as the "ring address". Bridge modules decode the ring address within a frame to determine if the destination of the frame is upon the source ring. The destination may actually lie beyond the target ring (e.g. transmitted from the target ring to another ring by another bridge module connected to the target ring). However, the bridge module transmitting from the source ring to the target ring does not determine whether or not transmission to another ring is to occur. At each ring level, the frame is recognized as having a destination on a target ring by at most one bridge module (i.e. the ring addresses detected by each bridge module upon a particular ring are exclusive of each other). Advantageously, a bridge module connected between rings 16 and 18 may employ substantially the same functionality as a bridge module connected between ring 18 and the ring within local ring group 24A. Each bridge module is programmed with an address mask which is used to determine which transactions should be transmitted from one ring to the other (and vice versa).

For example, bridge module 20A is programmed to recognize ring addresses which are external to local ring group 24A when examining a frame received upon the local ring within local ring group 24A. If such a ring address is detected, the corresponding frame is transmitted onto ring 18 and removed from the local ring by bridge module 24A. Conversely, bridge module 20A recognizes the ring address assigned to the local ring when examining frames received upon ring 18. When such a frame is detected, bridge module 20A transmits the frame onto the local ring. Other frames are retransmitted upon the source ring from which they are received. Bridge modules 20B–20D operate similarly with respect to ring addresses corresponding to local ring groups 24B–24D, respectively. Bridge module 12A recognizes each ring address which is not assigned to local ring groups 24A–24D when examining frames received upon ring 18, and recognizes the ring addresses corresponding to local ring groups 24A–24D when examining frames received upon ring 16.

The relative simplicity of matching ring addresses to a predetermined exclusive range of addresses allows for a rapid determination of whether or not a frame is retransmitted upon the source ring or transmitted upon a target ring. Therefore, high speed frame forwarding may be employed. According to one embodiment employing optical links, time slots comprising 1 nanosecond may be achievable.

Transactions between modules upon a local ring may be performed with very low latency due to the short time slots and by minimizing the ring transit time within local ring groups 24A. Transactions which traverse multiple rings may occur more slowly. Generally, software which operates within computer system 10 may attempt to maximize the communication between modules within a local ring group 24 and minimize communication between local ring groups 24 to achieve high performance computing within an application.

As used herein, a module refers to a device which attaches to a ring within computer system 10. The module includes logic for performing ring interface functions. Additionally, the module includes other functionality as desired. For example, CPU modules 26A–26D include at least one CPU each. In one particular embodiment, each CPU module 26A–26D includes up to two CPUs and an L2 cache which is shared by the CPUs. Memory modules 28A include a plurality of dynamic random access memories (DRAMs) and a DRAM controller in addition to the ring interface logic. Bridge modules include two sets of ring interface circuitry (one for each ring connected thereto) as well as buffering for frames which are removed from a source ring and are to be transmitted upon a target ring. I/O module 30 includes interface logic for an I/O bus upon which I/O devices may reside. For example, I/O module 30 may interface to the Peripheral Component Interconnect (PCI) bus according to one embodiment. Alternatively, I/O module 30 may interface to any suitable peripheral bus such as the Industry Standard bus (ISA), the Enhanced Industry Standard Bus (EISA), or the Microchannel bus. Finally, third party module 32 may employ any desired functionality (e.g. graphics devices, etc.).

Each module upon a given ring is identified by a second portion of the addresses within the address space of computer system 10. The second portion of the address is referred to as the "ring member". I/O modules such as I/O module 30, third party modules such as third party module 32, and memory modules such as memory modules 28A–28B determine if a particular frame is directed toward that module by examining the ring member portion of the address within the frame. If a match on the ring member is detected, then the corresponding module processes the frame.

The ring member also serves another function, according to one embodiment of computer system 10. Frames include a return address field in addition to the address and other fields (shown and discussed further below). The return address field is the same size as the ring member field, and stores the ring member corresponding to the module which transmitted the frame upon that ring. Bridge modules 12A–12D and 20A–20D replace the return address within a frame with the ring member assigned to that bridge module upon the target ring when transmitting frames from the source ring to the target ring. Therefore, the return address is an address local to the ring upon which the frame is circulating.

Because of the return address feature, the owner of a time slot may relinquish the time slot for use by another module on the ring. In typical time division multiplexing, the initiator of a frame within a time is inherent in the time slot itself. By providing the return address, however, the initiator is explicitly defined. Therefore, the time slot may be used by any module on the ring. Advantageously, a module which is not in need of a time slot for a period of time may release the bandwidth represented by the time slot for use by module which is experiencing heavy traffic. The full bandwidth of the ring may thereby be utilized even if traffic is not evenly distributed among the modules.

Time slots are released and reclaimed by the owner using an arbitration-less protocol. The owner releases a time slot by marking the frame therein as not owned. A module may use any time slot marked not owned if the frame therein is a null frame (i.e. no frame is being transmitted therein). A module uses the time slot by replacing the null frame with a non-null frame and setting the return address of the frame to the ring member corresponding to that module. The owner of the time slot reclaims the time slot by marking the time slot owned. The owner then monitors the time slot until the frame included therein is a null frame. Releasing and reclaiming owned time slots is described in more detail below.

Generally speaking, a frame is transmitted within a time slot by each module. The receiving module processes the frame within the time slot within a period of time less than the length of the time slot and then passes the frame and time slot on to the next module upon the ring. Using the quick address masking method, very short time slots may be achieved.

Another feature of computer system 10 which uses the return address is chain transactions. Chain transactions use multiple frames to transmit large blocks of data from one ring to another. The initial frame in the chain transaction specifies the addresses involved, and subsequent frames are used to transmit the data. Chain transactions employ a special control encoding within the frames to identify the transactions as part of the chain. Using this encoding and the return address field, frames within the chain transaction can be identified. As the initial frame of the chain transaction is routed using the address within the frame, each bridge module involved in transmitting the frame from the source ring to the destination ring records the return address from the initial frame (and inserts its own ring member within the target frame, as with other frames).

Each bridge module involved in the chain transaction subsequently accepts frames marked as chain frames only from the module having the return address of the current chain transaction (or the return address of that bridge module, in the case of read chain transactions). Other chain frames are left on the source ring by the bridge module. Advantageously, the address field of the frame can be used to transport data, thereby increasing the throughput. Because the return addresses specify the source of each frame within the chain transaction upon the source ring, each bridge module can identify the chain transaction via the control encoding and the return address. The bridge modules involved in the chain transaction form a virtual channel for the chain transaction, since only chain frames having the return address recorded from the initial frame of the chain transaction are transmitted to the target ring.

Computer system 10 controls congestion within the bridge modules, memory modules, I/O modules, and third party modules using the time slots within the rings instead of large buffers within the module. If a frame is received by a module and the module is to operate upon the frame (e.g. the bridge module transmits the frame to the target ring, or the other modules are the destination of the frame), the module may simply retransmit the frame upon the source ring if the module cannot service the frame upon receipt. Smaller buffers may be employed within the modules, using the time slots upon the ring itself as buffering. If a frame is not removed from the ring by the module which is intended to act upon it, the time slot remains occupied by that frame. The owner of the time slot (or the current user, if the owner has released the time slot) is thereby prevented from inserting a new frame into the time slot. Congestion is thereby backed up to the initiating modules without requiring large buffers within receiving modules.

Modules which return or accept data only (i.e. which do not initiate transactions) such as memory modules 28A–28B may be assigned no time slots, if desired. Such modules return data for a transaction using the time slot owned by the initiator of the transaction. As will be discussed in more detail below, memory modules may acknowledge a transaction within a frame while leaving the frame within the time slot. When the corresponding data is ready to be returned, the data is placed into the frame and the module which initiated the transaction receives the data when the frame returns to that module.

According to one embodiment, memory coherency is not enforced by the hardware of computer system 10. Instead, the software executed by the CPUs within computer system 10 maintain memory coherency. According to one particular embodiment, pages may be indicated as owned by a particular process and not writeable by other processes, owned and not writeable by the process, or owned and writeable by all. The indication is part of the translation applied by the operating system to the process.

Figure 2:
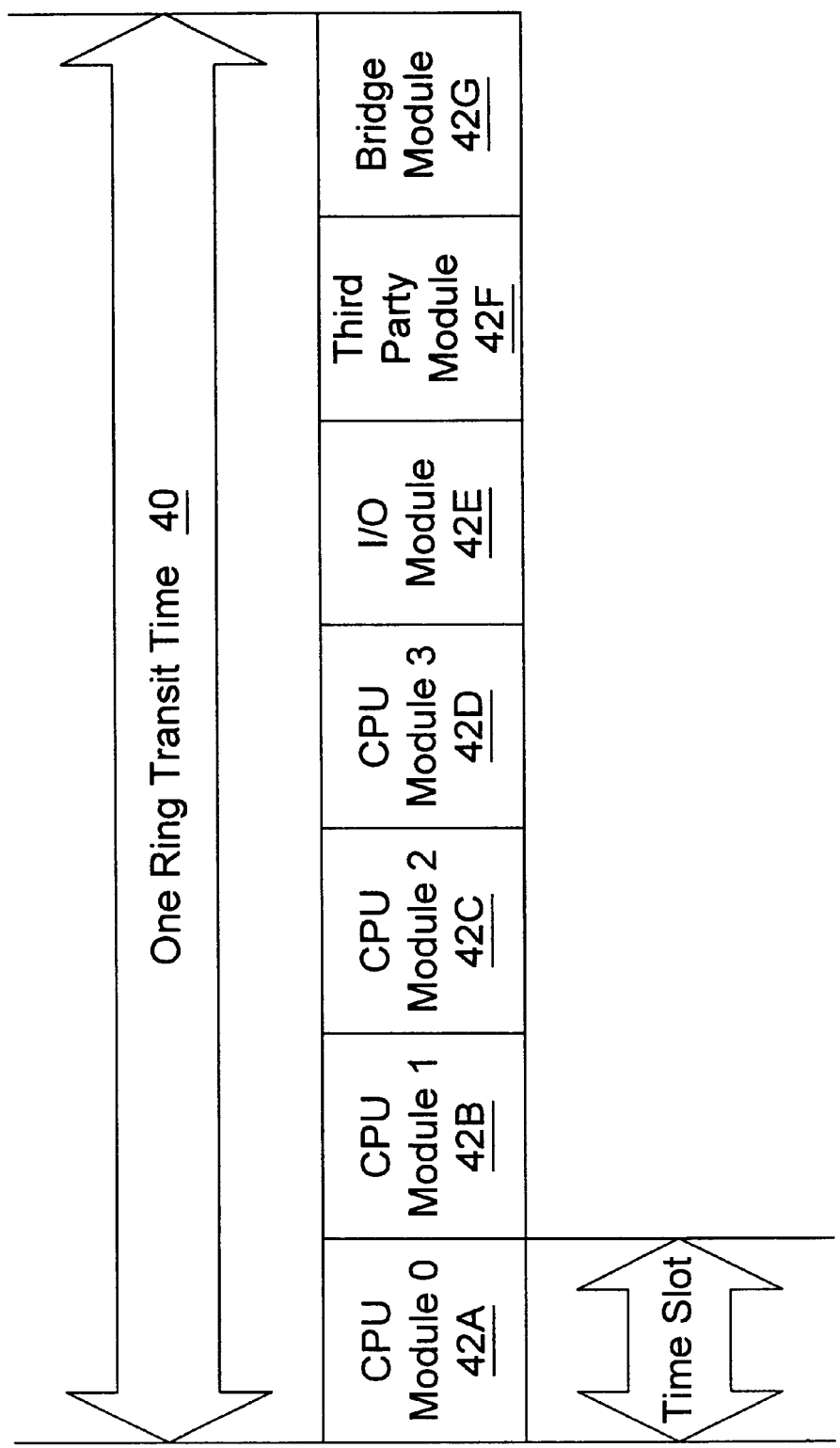
FIG. 2 is a diagram illustrating time division multiplexing upon one of the rings shown in FIG. 1.

Turning now to FIG. 2, a timing diagram is shown illustrating time division multiplexing for one embodiment of the ring within local ring group 24A is shown. One ring transit time (i.e. the amount of time elapsing from when a time slot leaves a point on the ring and arrives back at that point on the ring) is illustrated by arrow 40. The ring transit time is divided into multiple time slots 42A–42G. Each time slot is assigned to a module upon the ring (e.g. time slot 42A is assigned to CPU module 0, time slot 42B is assigned to CPU module 1, etc.). The module to which a particular time slot 42A–42G is assigned is the owner of the particular time slot 42A–42G. Owners of time slots are statically assigned upon initialization of computer system 10. However, as described above and in more detail below, the owner of a particular time slot 42A–42G may release a time slot for use by a non-owner module if the owner is not in need of the time slot.

The communication lines on the ring include lines for conveying the bits within a frame as well as at least one clock line. The signal on the clock line is transmitted by the transmitting module and is used by the receiving module to indicate that a frame is arriving. The transmitting module generates the clock signal upon the clock line to the receiving module, and may therefore insert delay from the clock signal received by the transmitting module. The inserted delay may be used by the ring control logic within the transmitting module to perform address masking and insert or remove frames from the ring.

Although one time slot 42A–42G is assigned per module as shown in FIG. 2, multiple time slots may be assigned to each module. For example, if the ring transit time is 15 nanoseconds, time slots are 1 nanosecond wide, and five modules reside on a ring, each module may be assigned three time slots.

During system initialization, time slots are assigned. Each module upon the ring has a unique ring member number which identifies the module within the ring. Upon initialization each module transmits a message to the particular module having the lowest ring member number to identify itself to the particular module. The particular module then begins transmitting frames in time slots. Each successive frame is assigned to a different ring member using the return address field. The particular module rotates through the ring members which identified themselves to the particular module via the aforementioned messages. After exhausting the list, the particular module begins assigning ring members from the beginning of the list again. The particular module continues the process of transmitting frames until the first transmitted frame returns to the particular module from the ring. The time slots are thereby assigned. As mentioned above, the assignment is static but the owning module may allow other modules to use an assigned time slot by marking the time slot not owned.

Figure 3:
FIG. 3 is a diagram illustrating one embodiment of a frame transmitted upon the rings shown in FIG. 1.

Turning now to FIG. 3, a diagram illustrating an exemplary frame 50 is shown. Frame 50 may be employed according to one embodiment of computer system 10. Frame 50 includes a first address/data field 52, a second address/data field 54, an own bit 56, a control field 58, a return address field 60, a far bit 62, an illegal memory request bit 64, a return request bit 66, a buffer full bit 68, an error detection field 70, and a serialization control field 72.

First address/data field 52 and second address/data field 54 are used to transmit either addresses or data, depending upon the type of transaction being performed (as specified by control field 58). According to one embodiment, each address/data field 52 and 54 is 64 bits wide.

Own bit 56 is used by the owner of the time slot to release and reclaim the time slot in which frame 50 is transmitted. If own bit 56 is clear, the owner is allowing use of the time slot by other modules. If own bit 56 is set, the owner is reclaiming the time slot (or is maintaining ownership, if the time slot has already been reclaimed). While the bit being set indicates ownership and being clear indicates release in the present embodiment, any indication may be used. Similarly, other bits used herein are described as set or clear to communicate information, but any indication may be used to communicate the corresponding information. For frame 50, the owner of the time slot marks the time slot owned by setting own bit 56 and marks the time slot not owned by clearing own bit 56. The owner of the time slot may modify own bit 56, but other modules are not permitted to modify own bit 56.

Figure 5:
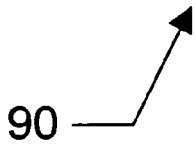
FIG. 5 is a table of control field encodings employed by one embodiment of the frame shown in FIG. 3.

Control field 58 indicates the type of transaction being transmitted by frame 50. FIG. 5 below lists the types of transactions and corresponding encodings for control field 58 according to one embodiment of computer system 10.

Return address field 60 is used to store the return address of the source module for the frame. The return address is a local address to a ring (i.e. it identifies a module upon the ring upon which frame 50 is circulating). Return address field 60 allows for time slots to be used by a module other than the owner of the time slot, and further allows for chain transactions to carry more data. The first frame of a chain transaction may carry address information regarding the source and destination of the transaction, and subsequent frames may use both address/data fields 52 and 54 for transferring data. The subsequent frames are routed using the return addresses.

Far bit 62 is used to identify transactions which are not local to the ring upon which frame 50 is circulating. For example, if far bit 62 is set, the transaction targets a module upon a different ring. If far bit 62 is clear, then transaction targets a module upon the current ring. Far bit 62 is used by read transactions as described below with respect to FIG. 4.

Illegal memory request bit 64 is used to communicate that the request represented by frame 50 is illegal. A memory request may be illegal, for example, if the address of the memory request does not map to a physical memory location. Computer system 10 may or may not be outfitted with the maximum amount of memory supported by the address space. If less than the maximum amount of memory is supported, then addresses may not map to a physical memory location. Illegal memory request bit 64 may be set by the addressed memory module in this case. Alternatively, an address of a memory request may be illegal if the ring member portion of the address corresponds to a ring member which is not present upon the ring (or is not responding for some reason). The bridge module attached to the destination ring may detect this situation and set illegal memory request bit 64 as the request is returned.

Return request bit 66 is used to indicate that a transaction within frame 50 is being returned. The source of the transaction uses return request bit 66 to determine that the transaction is complete. The transaction may be complete in an error or non-error mode. For example, return request bit 66 may be set for a read transaction when the data is returned to the source of the transaction. Alternatively, a transaction may be returned because the address resulted in the setting of illegal memory request bit 64.

Buffer full bit 68 is used by the module which is to respond to frame 50 upon the ring upon which frame 50 is circulating (the "target module") to acknowledge the frame but to indicate that the frame cannot be processed by the target module immediately. The target module may be a memory or I/O module, or may be a bridge module which is to transmit the frame onto another ring. By setting buffer full bit 68, the target module may allow the frame to continue circulating on the current ring and inform the source of the frame that the frame will be processed at some time when the frame arrives at the target module and the target module is able to process the frame. More particularly, buffer full bit 68 provides positive acknowledgment to the source module of the frame upon the ring upon which the frame is circulating that the frame has been recognized. If the source module receives frame 50, it has not been processed, and buffer full bit 68 is clear, then an error condition may have occurred. The source module may not use the time slot carrying frame 50 with buffer full bit 68 set until frame 50 is processed by the target module. By setting buffer full bit 68 and allowing frame 50 to continue circulating on the source ring, the target module controls the flow of transactions to or through the target module. The time slots are effectively used as buffer locations, thereby allowing reduced buffer sizes within the modules as compared to a conventional bus structure.

Error detection field 70 is used to transmit error detection data for the other fields of frame 50. The data in error detection field 70, in combination with the data transmitted in the remaining fields, can be logically operated upon to detect errors which may occur in transmitting the data. For example, error detection field 70 may be used to transmit single error correction, double error detection (SECDED) data. Using the SECDED data in a predetermined exclusive OR with bits from fields 52–68 allows for a single bit error in fields 52–68 to be corrected and a double bit error in fields 52–68 to be detected.

Serialization control field 72 is used when a particular module has multiple transactions outstanding. The module may use values within serialization control field 72 for ordering responses to the multiple outstanding transactions (e.g. read data returning).

Turning next to FIG. 4, a table 80 is shown illustrating the types of transactions supported by one embodiment of computer system 10 and the contents of first address/data field 52 and second address/data field 54 for each type of transaction. Some transactions are represented by more than one row in table 80 (i.e. more than one operation may comprise a transaction). The operation types are listed in a column 82, while the contents of first address/data field 52 are listed in a column 84 and the contents of second address/data field 54 are listed in a column 86.

A "read near" transaction is a transaction between two modules residing upon the same ring. Return address field 60 may be used to record the source module of the transaction, and far bit 62 is clear to indicate that the transaction is a "read near" transaction. Since neither of address/data fields 52 and 54 are needed to identify the source module, two different addresses may be included in a read near request operation. The target module inserts the corresponding data into address/data fields 52 and 54 and sets return request bit 66 to form the read near reply operation of the read near transaction.

On the other hand, a "read far" transaction is a transaction between modules residing upon different rings. Far bit 62 is set by the source module for read far transactions. Address/data field 52 conveys the address to be read in response to the read far transaction, and address/data field 54 is used to convey the return address of the source module. The return address, in this case, is the full address of the source module within computer system 10 (i.e. it includes the ring address and ring member of the source module). The return address within second address/data field 54 is used to route the data corresponding to the address in first address/data field 52 from the target module back through one or more bridge modules to the source module. The target module, when returning the data, sets return request bit 66, moves the return address from second address/data field 54 to first address/data field 52, and places the data being read into second address/data field 54. The return address is used by the bridge modules to route frame 50 back to the source module (e.g. the read far reply operation in table 80).

A write transaction, either near or far, is performed using one frame. First address/data field 52 carries the target address of the write transaction, and second address/data field 52 carries the data being written by the source module. When a target module receives a write transaction, the target module replaces the transaction in the frame with a null transaction unless an error is detected.

Atomic transactions are supported for to provide for software managed coherency. An atomic transaction updates an address at a target module and reads the current value stored at that address to returned to the source module. The atomic request operation conveys the address of the transaction using first address/data field 52 and the data to be written using second address/data field 54. The target module returns the address of the transaction in first address/data field 52 and the previous data value in second address/data field 54 in the atomic reply operation. Similar to read and write chain transactions, the bridge modules which transmit the atomic request frame record the return address of the sender to route the atomic reply back to the source module.

Read chain and write chain transactions are also shown in table 80. As mentioned above, the chain transactions are performed by locking the bridge modules between the source module and the target module. When a bridge module is not involved in a chain transaction and receives a chain frame upon a source ring and the chain frame has an address recognized by that bridge module as external to the source ring, the bridge module records the return address from the frame and forwards the frame upon the target ring. When a bridge module is involved in a chain transaction, the bridge module transmits chain frames from a source ring to a target ring only if the return address of the frame is the same as the recorded return address. Each bridge module between the source module and the target module records the return address as the first frame of the chain is received (i.e. a first bridge module coupled to the source module's ring records the return address of the source module, a second bridge module coupled to a ring with the first bridge module and configured to route the first frame of the chain records the return address of the first bridge, etc.). After the first frame, the channel between the source module and the target module (across one or more rings) is established by the recorded return addresses. Therefore, subsequent frames within the chain transaction may use both address/data fields 52 and 54 to transmit data. The first frame of a read chain transaction transmits the address being read from in first address/data field 52. The size of the transfer (measured, for example, in either bytes or 64 bit doublewords) and the return address of the source module (ring address and ring member) is conveyed in second address/data field 54. The first frame of a write chain transaction specifies the target address in first address/data field 52 and the source address in second address/data field 54.

Turning now to FIG. 5, a table 90 is shown listing encodings for control field 58 according to one embodiment of computer system 10. The Null encoding is used for several purposes. When a frame is removed from a ring (e.g. by a bridge module or when the transaction is complete), if no new transaction is inserted by the module performing the removal, the Null frame is transmitted. Additionally, the Null frame plays a role in an owner reclaiming a time slot. The owner sets owned bit 56 within a frame occupying a time slot to be reclaimed. The module using the time slot responds by removing the transaction being transmitted with that frame and inserting the Null frame. Read, write, atomic, read chain, and write chain transactions have encodings. Additionally, an end read chain and an end write chain encoding are included. The final frame of a chain transaction uses either the end read chain or end write chain encoding (whichever is appropriate) to indicate the end of the chain transaction. Each bridge ends the chain transaction after forwarding the frame encoded as the end of the chain.

Figure 6:
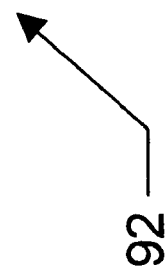
FIG. 6 is a diagram of an address according to one embodiment of the computer system shown in FIG. 1.

Turning next to FIG. 6, a diagram of an exemplary address 92 within the address space of one embodiment of computer system 10 is shown. A most significant portion of address 92 comprises a ring address 94. A next most signification portion of address 92 comprises ring member 96. A least significant portion of address 92 comprises an internal ring address 98.

Ring address 94 identifies the ring which contains the addressed location. Each ring within computer system 10 is assigned a unique ring address which distinguishes the ring from other rings. Ring address 94 is the portion of the ring address examined by bridge modules for determining if a frame is to be transferred from a source ring to a target ring or is to be retransmitted upon the source ring. In one embodiment, the ring address 94 comprises 16 bits, allowing for up to 64 k rings.

Ring member 96 identifies a module upon the ring identified by ring address 94. Each module upon a given ring is assigned a unique ring member value. The ring member value is also used as the return address in return address field 60. In one embodiment, ring member 96 comprises 4 bits, allowing for up to 16 ring members on a given ring.

Internal ring address 98 is an address within a module. For example, internal ring address 98 specifies a memory location within a memory module. In one embodiment, internal ring address 98 comprises 44 bits.

Figure 7:
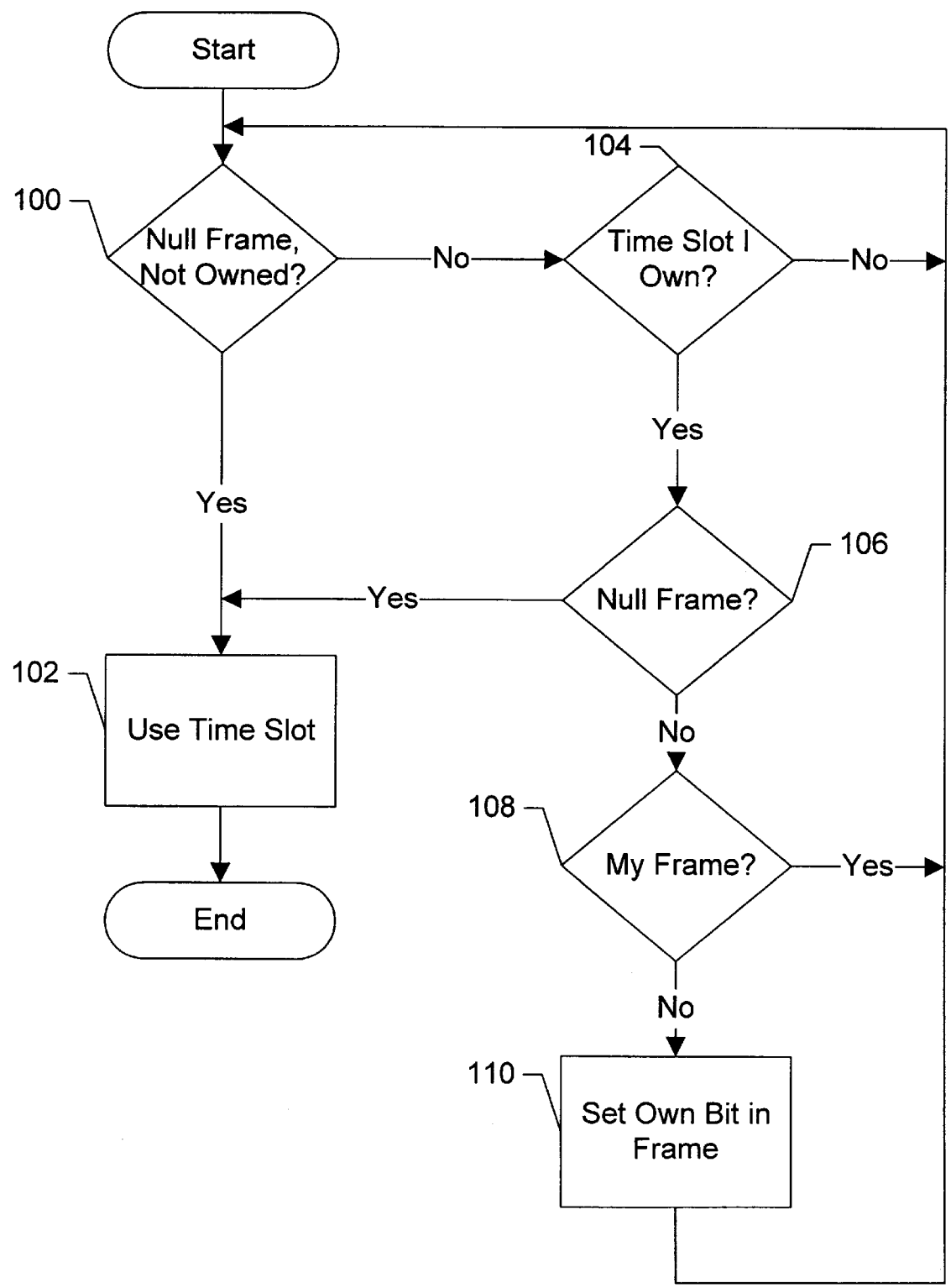
FIG. 7 is a flowchart illustrating claiming a frame according to one embodiment of the computer system shown in FIG. 1.

Turning now to FIG. 7, a flowchart is shown illustrating operation of a module upon receiving a time slot if the module is attempting to transmit a particular frame, according to one embodiment of computer system 10.

The module examines the frame within the received time slot (the "current frame") and determines if the current frame is both null (as indicated by control field 58) and not owned (as indicated by own bit 56). If the current frame is a null frame which is not owned (decision block 100), the module inserts the particular frame into the time slot and transmits the time slot (step 102).

If the current frame is not null, the module determines if it is the owner of the time slot (decision block 104). If the module is not the owner of the time slot, then the module retransmits the current frame and awaits the next time slot to repeat the process of FIG. 7. On the other hand, if the module is the owner of the time slot, the module determines if the current frame is null (decision block 106). The frame may be null but owned, and therefore fail the test of decision block 100. However, if the frame is null and owned, but the module is the owner, then the module may use the time slot to transmit the particular frame (step 102).

If the current frame is not a null frame, the module determines if the current frame is a frame previously transmitted by the module (decision block 108). The module determines if it previously transmitted the current frame by examining the return address of the current frame. If the current frame was previously transmitted by the module, the module retransmits the current frame and awaits the next time slot to repeat the process of FIG. 7. However, if the current frame was not previously transmitted by the module, the module sets own bit within the frame (step 110) and retransmits the frame. Step 110 is the first step in reclaiming an owned time slot which was previously released. Subsequently, another module using the time slot replies with a null frame (still marked owned). Via decision blocks 104 and 106, the module subsequently uses the time slot.

It is noted that, while the steps in the flowchart of FIG. 7 and in the other flowcharts described herein are shown serially for greater understanding, the steps may be performed in parallel by the hardware of computer system 10 to achieve high frequency operation.

Figure 8:
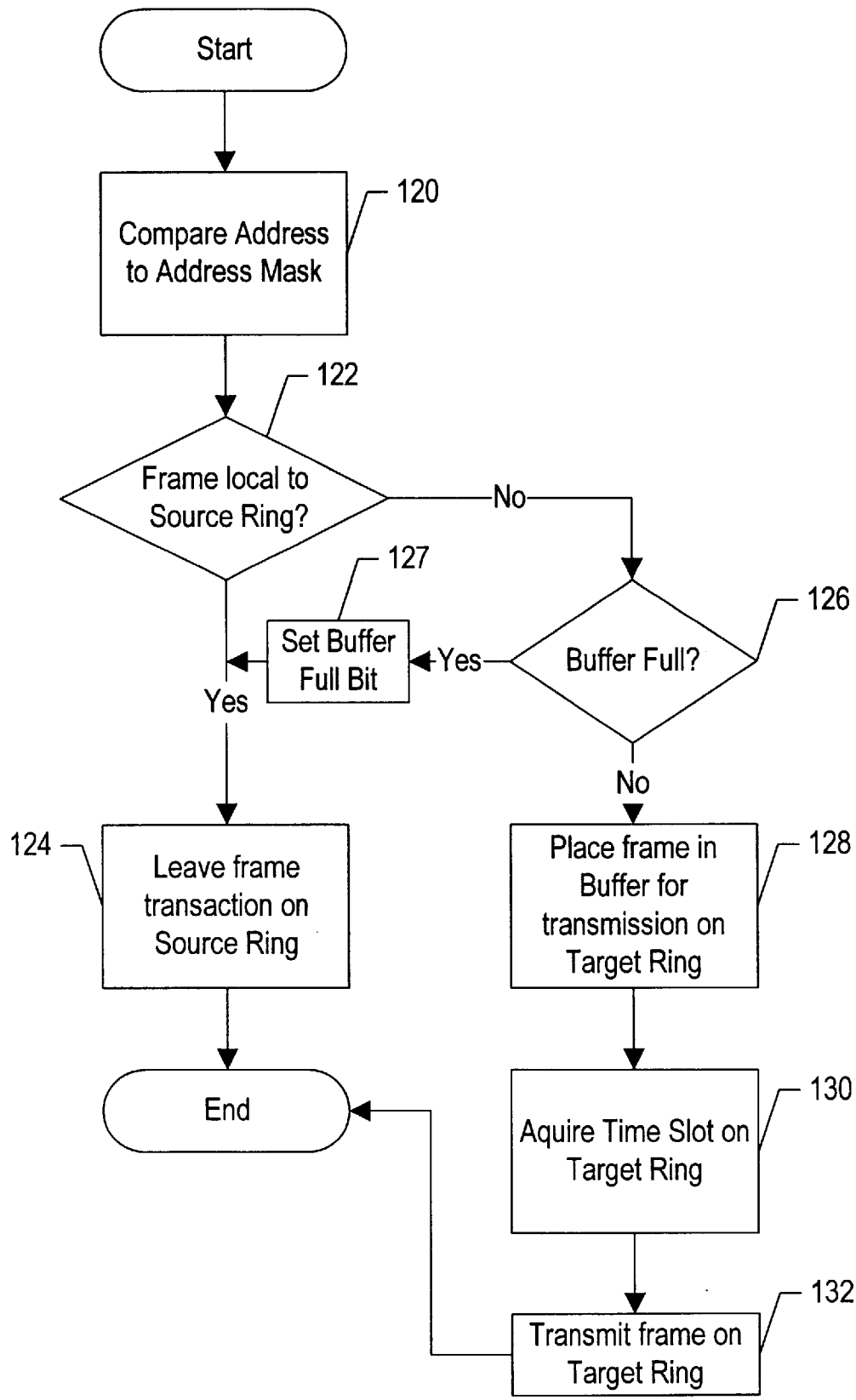
FIG. 8 is a flowchart illustrating operation of one embodiment of a bridge module shown in FIG. 1.

Turning now to FIG. 8, a flowchart is shown illustrating operation of one embodiment of a bridge module when receiving a frame from a source ring. The bridge module compares the address within the frame to an address mask which represents the target ring and any rings connected to that target ring via other bridge modules (step 120).

The bridge module determines from the results of step 120 whether or not the frame is local to the source ring (decision block 122). If the frame is local, then the bridge module retransmits the frame on the source ring (step 124). On the other hand, the frame may not be local to the source ring. The bridge module determines if the buffer internal to the bridge module is full (decision block 126). If the buffer is full, then the bridge module retransmits the frame on the source ring even if the frame is not local to the source ring. In this case, the bridge module sets buffer full bit 68 to indicate recognition of the frame (step 127). If the buffer is not full and the frame is not local to the source ring, then the bridge module places the frame into the buffer for subsequent transmission on the target ring (step 128). Subsequently, the bridge module acquires a time slot on the target ring (step 130). For example, the bridge module may perform the process shown in FIG. 7. Upon acquiring a time slot, the bridge module transmits the frame on the target ring (step 132). The bridge module inserts the ring member value assigned to the bridge module upon the target ring into return address field 60 of the frame prior to transmitting the frame on the target ring.

It is noted that, while the steps in the flowchart of FIG. 8 and in the other flowcharts described herein are shown serially for greater understanding, the steps may be performed in parallel by the hardware of computer system 10 to achieve high frequency operation.

Figure 9:
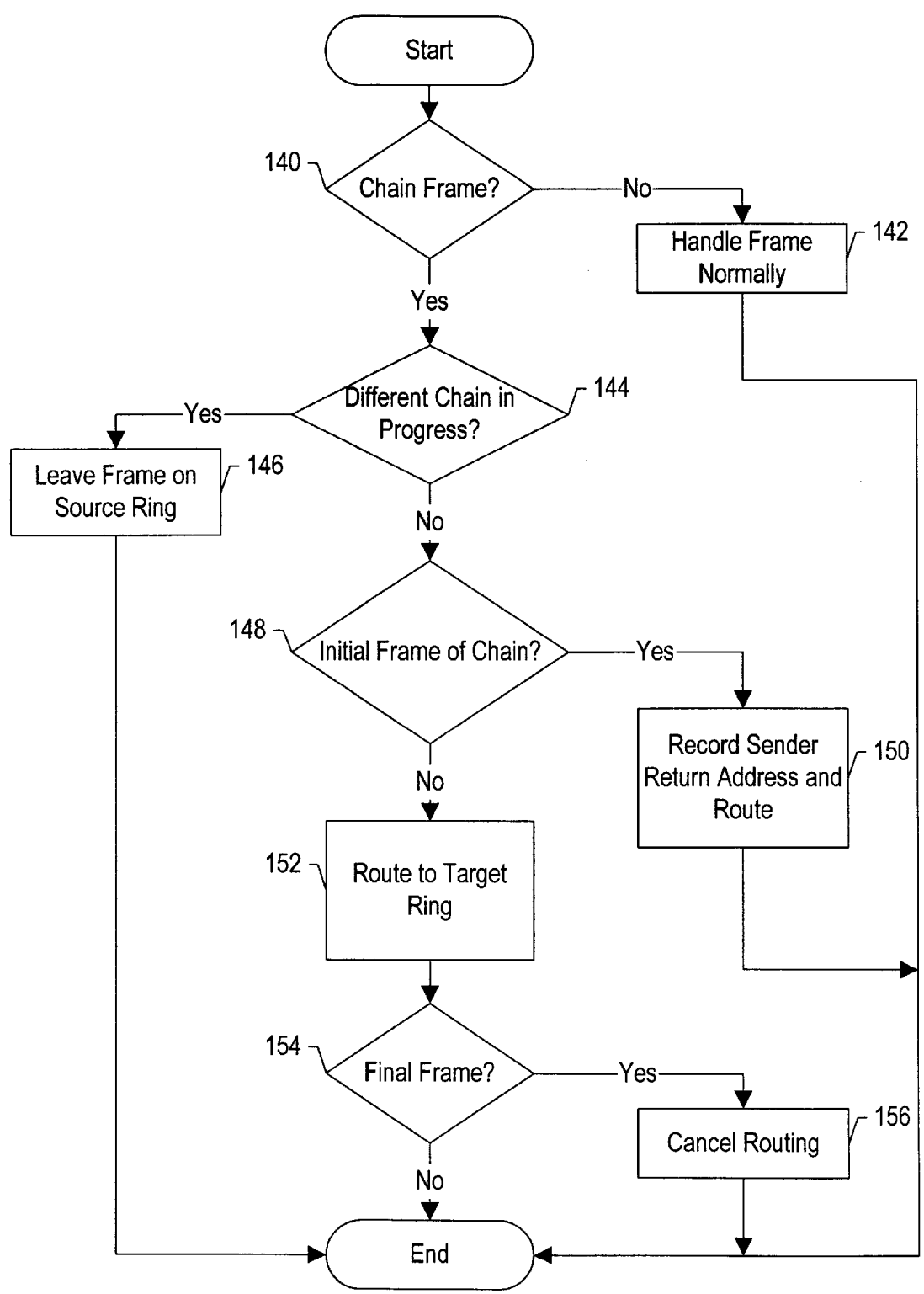
FIG. 9 is a flowchart illustrating operation of one embodiment of a bridge module shown in FIG. 1 for chain transactions.

Turning now to FIG. 9, a flowchart is shown illustrating operation of one embodiment of a bridge module employing chain transaction functionality when the bridge module receives a frame which the bridge module determines is to be transmitted upon the target ring. The bridge module determines if the frame is marked as a chain transaction (a "chain frame") (decision block 140). If the frame is not a chain frame, the frame is handled normally (e.g. according to the flowchart shown in FIG. 8, according to one embodiment) (step 142).

On the other hand, if the frame is a chain frame, the bridge module determines if another chain transaction is in progress (decision block 144). As mentioned above, the return address of the sender is recorded by the bridge module when a chain transaction is initiated. The bridge module determines if a chain frame is part of a write chain transaction in progress by comparing its return address to the recorded return address. If the return addresses match, the chain frame is part of the same write chain transaction. Alternatively, if a read chain transaction is in progress, the chain frame is part of the same chain transaction if the return address is equal to the ring member of the bridge module upon the source ring. If the return addresses differ, the chain frame is part of a different chain transaction. Additionally, if no chain transaction is in progress, the bridge module follows the "No" leg of decision block 144.

If the bridge module determines that a different chain transaction is already in progress, the frame is retransmitted upon the source ring from which it is received (step 146). In this manner, the bridge module forwards chain frames from one chain transaction at a time. Together with the other bridge modules involved in the chain transaction, the bridge module forms a virtual channel for routing the chain frames corresponding to the in-progress chain transaction (i.e. the route from the source module to the destination module is determined without need of additional addresses corresponding to the source module and destination module at each bridge module).

If the bridge module determines that a different chain transaction is not in progress, then the bridge module determines if the chain frame is the initial frame of the chain transaction (decision block 148). The chain frame is the initial frame if there is no chain transaction in progress. If there is no chain transaction in progress, the bridge module records the sender's return address (i.e. the return address of the module connected to the source ring, which may be another bridge module or the source module of the transaction) and the fact that a chain transaction is now in progress. Additionally, the bridge module routes the chain frame onto the target ring (step 150). On the other hand, if the chain frame is a subsequent frame within the same chain, the bridge module routes the chain frame onto the target ring (step 152). For subsequent write chain frames, the return address of the bridge module is inserted into return address field 60. For subsequent read chain frames, the return address of the sender is inserted into return address field 60.

After routing the chain frame on the target ring, the bridge module determines (from the control field encoding) whether or not the chain frame is the final frame of the chain transaction (decision block 154). If the chain frame is the final frame, the bridge module cancels the routing corresponding to the chain transaction (step 156). A new chain transaction may thereby be allowed to start.

It is noted that, while the steps in the flowchart of FIG. 9 and in the other flowcharts described herein are shown serially for greater understanding, the steps may be performed in parallel by the hardware of computer system 10 to achieve high frequency operation.

Figure 10:
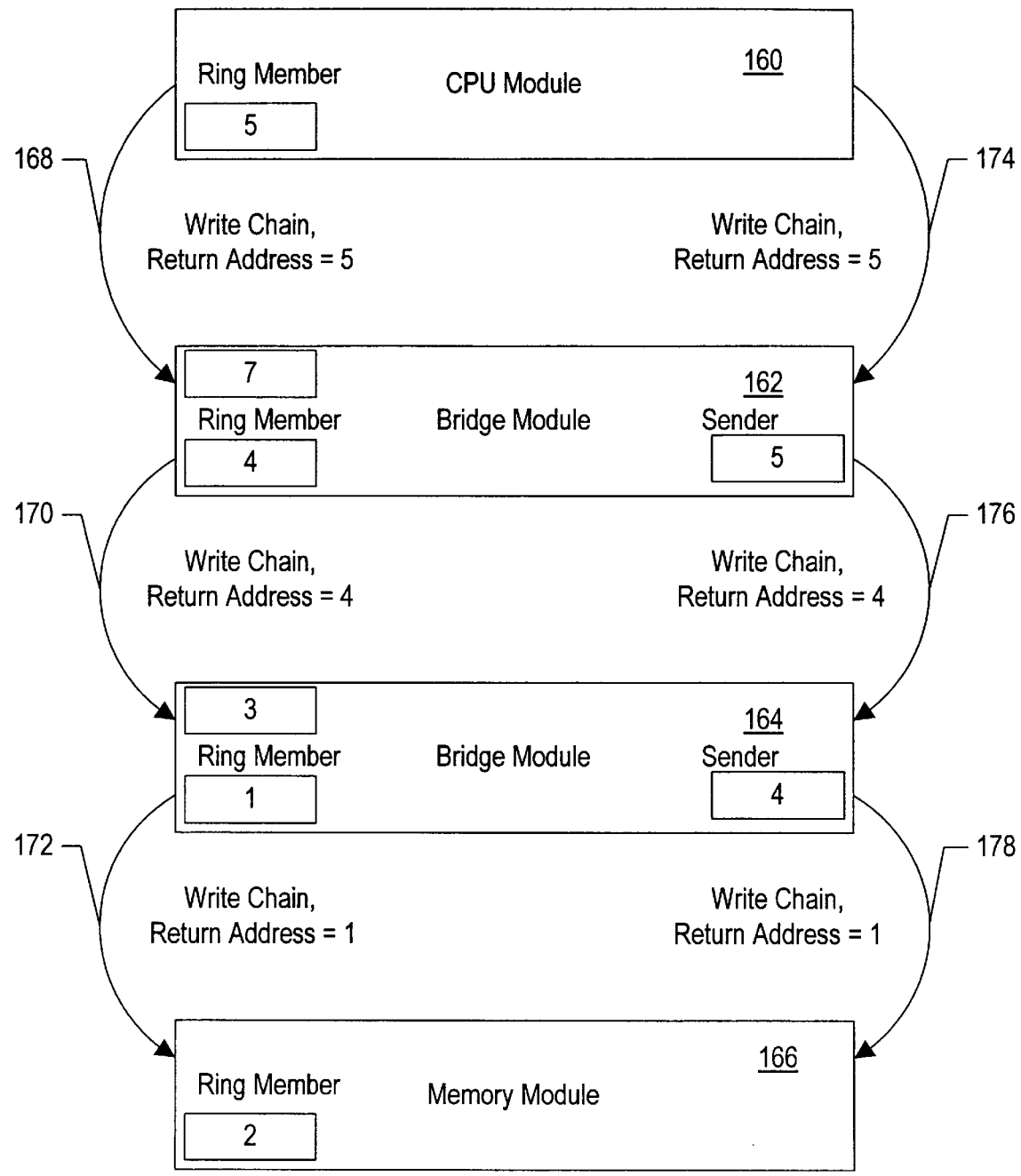
FIG. 10 is an example of a write chain transaction according to one embodiment of the computer system shown in FIG. 1.

Turning now to FIG. 10, an example of a write chain transaction between a CPU module 160 and a memory module 166 through a pair of bridge modules 162 and 164 is shown. CPU module 160 and bridge module 162 are attached to a first ring (not shown) upon which CPU module 160 is assigned ring member 5 and bridge module 162 is assigned ring member 7. Bridge module 162 and bridge module 164 are attached to a second ring (not shown) upon which bridge module 162 is assigned ring member 4 and bridge module 164 is assigned ring member 3. Finally, bridge module 164 and memory module 166 are attached to a third ring (not shown) upon which bridge module 164 is assigned ring member 1 and memory module 166 is assigned ring member 2.

In the present example, CPU module 160 initiates a write chain transaction to an address within memory module 166. The progress of the initial frame of the write chain transaction from CPU module 160 to memory module 166 is illustrated via arrows 168, 170, and 172. Arrows 168, 170, and 172 illustrate a high level view of the progress of the initial frame. The initial frame and subsequent frames (as described below) may pass through one or more modules upon each ring between the modules shown in FIG. 10.

CPU module 160 conveys the initial frame upon the first ring, using a return address of 5 (the ring member assigned to CPU module 160) within return address field 60. Bridge module 162 receives the initial frame, and examines the target address from second address/data field 54. Detecting that the target address is not within the first ring, bridge module 162 transmits the initial frame upon the second ring (arrow 170). Bridge module 162 changes the return address within return address field 60 of the initial frame to 4 (the ring member of bridge module 162 on the second ring). Additionally, bridge module 162 records the sender return address of the initial frame (i.e. 5), since the frame is indicated to be a write chain frame via control field 58.

Bridge module 164 receives the initial frame upon the second ring and determines that the target address of the initial frame is on the third ring. Therefore, bridge module 164 transmits the initial frame upon the third ring (changing the return address within return address field 60 to 1, the ring member of bridge module 164 upon the third ring, shown at arrow 172). Additionally, bridge module 164 records the sender return address from return address field 60 of the initial frame (i.e. 4, the ring member of bridge module 162 on the second ring) since the frame is marked as a write chain frame. Memory module 166 receives the initial frame and records the addresses therein for performing the writes corresponding to the write chain transaction. The source address is recorded in case an error is detected requiring the return of a request. The target address specifies the first address to be updated in response to the write chain transaction.

CPU module 160 transmits subsequent frames of the write chain transaction as well. The subsequent frames are routed as shown by arrows 174, 176, and 178. As shown in FIG. 4, the subsequent frames carry data in both first address/data field 52 and second address/data field 54. When bridge module 162 receives subsequent frames upon the first ring, bridge module 162 detects that the return address within return address field 60 of the subsequent frames matches the recorded return address from the initial frame, and that the frame is a write chain frame. Therefore, bridge module 162 routes the subsequent frames onto the second ring, replacing the return address within return address field 60 with bridge module 162's ring member upon the second ring. Similarly, bridge module 164 detects that the subsequent frames are write chain frames and have a return address matching its recorded sender address, and therefore forward the subsequent frames onto the third ring. Memory module 166 thereby receives the subsequent frames, and stores the data conveyed therein into successive addresses in memory beginning with the target address conveyed in the initial frame. CPU module 160 transmits the last frame of the write chain transaction marked as an end write chain frame. Bridge modules 162 and 164 end their virtual channel upon receiving the end write chain frame, and memory module 166 performs the final write in response to the end write chain frame. The write chain transaction is thereby completed.

Figure 11:
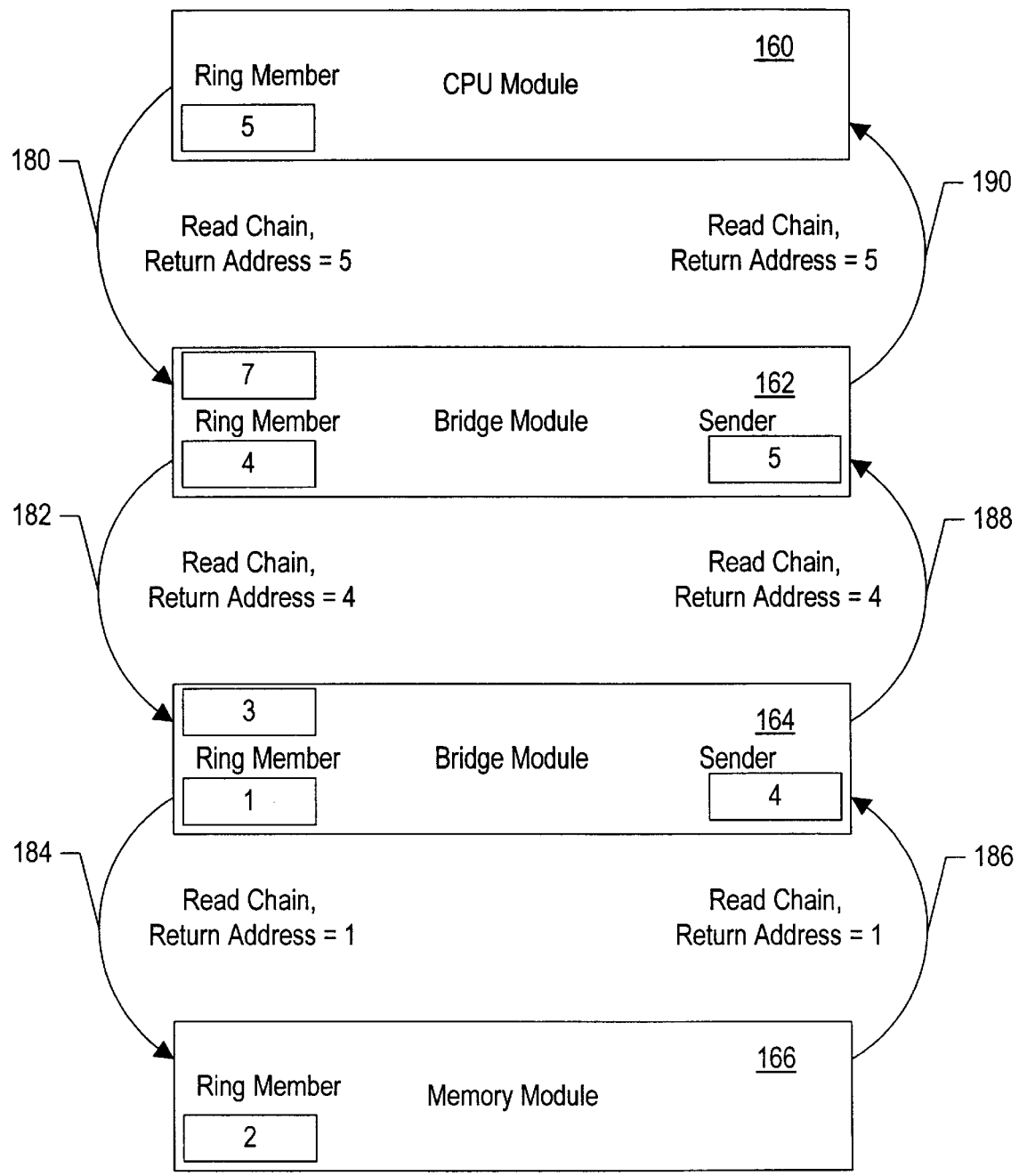
FIG. 11 is an example of a read chain transaction according to one embodiment of the computer system shown in FIG. 1.

Turning next to FIG. 11, an example of a read chain transaction between CPU module 160 and memory module 166 through bridge modules 162 and 164 is shown. CPU module 160, memory module 166, and bridge modules 162 and 164 are coupled to the first, second, and third rings as described above with respect to FIG. 10.

The initial frame of the read chain transaction is transmitted by CPU module 160 and progresses across the first, second and third rings as illustrated by arrows 180, 182, and 184. As mentioned above, the initial frame (and the reply frames described below) may pass through one or more modules on each ring as they pass through the rings.

CPU module 160 transmits the initial frame of the read transaction (carrying the address to be read and the size of the transaction, as well as the ring address and ring member of CPU module 160) upon the first ring (arrow 180). Bridge module 162 decodes the address from the initial frame and determines that the address is not on the first ring. Therefore, bridge module 162 transmits the initial frame on the second ring, replacing the return address within return address field 60 of the initial frame with the ring member of bridge module 162 upon the second ring (arrow 182). Additionally, bridge module 162 records the return address of the sender since the frame is marked as a read chain transaction.

Similarly, bridge module 164 receives the initial frame from the second ring and determines from the address within the initial frame that the initial frame should be transmitted onto the third ring (arrow 184). Bridge module 164 changes the return address within return address field 60 of the initial frame to be the ring member of bridge module 164 upon the third ring (i.e. 1). Additionally, bridge module 164 records the sender return address of the initial frame (i.e. 4) in response to the read chain encoding of the initial frame. Memory module 166 thereby receives the initial frame. The size of the transfer determines how many reply frames will be sent by memory module 166, with each of address/data fields 52 and 54 within the reply frames carrying data.

The reply frames are transmitted by memory module 166 and propagate through bridge modules 164 and 162 to CPU module 160 as illustrated by arrows 186, 188, and 190. Each reply frame is marked (via control field 58) as a read chain frame except for the last reply frame, which is marked as an end read chain frame. Memory module 166 uses the return address from the initial frame as the return address within return address field 60 of the reply frames, similar to a non-chain read transaction. Each reply frame is transmitted upon the third ring and is received by bridge module 164. Recognizing its own return address and the read chain encoding, bridge module 164 routes the reply frames onto the second ring, replacing the return address within return address field 60 of the reply frames with the recorded sender return address (i.e. 4). It is noted that, in contrast to the placing of the recorded sender return address into return address field 60, bridge modules 162 and 164 place their own ring member into return address field 60 when transmitting a non-read-chain frame onto a target ring. Bridge module 162 receives the reply frames by recognizing its own return address upon the second ring, and transmits the reply frames upon the first ring. Bridge module 162 similarly replaces the return address within return address field 60 of the reply frames with the recorded return address (i.e. 5). CPU module 160 thereby receives each of the reply frames. As each module receives the last frame (marked as an end read chain transaction), the module releases the virtual channel formed for the read chain transaction. The read chain transaction is thereby completed.

Figure 12:
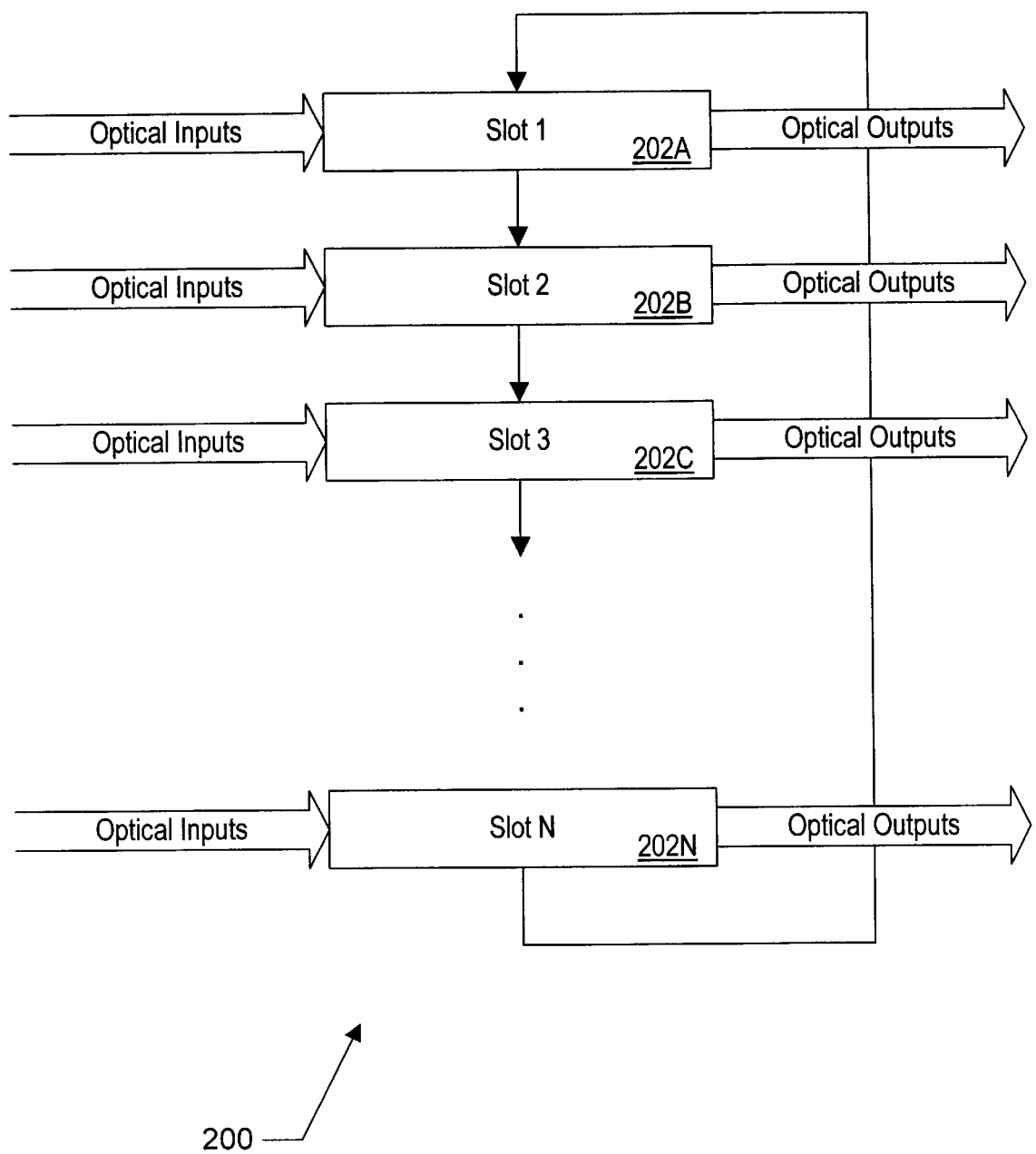
FIG. 12 is a block diagram illustrating implementation of a ring as a shift register.

According to one embodiment, one or more of the rings within computer system 10 may be reduced to a shift register connected to the modules within the ring. FIG. 12 is an illustration of an exemplary shift register 200. Shift register 200 comprises a plurality of slots 202A–202N. Each slot 202A–202N corresponds to a time slot upon the ring represented by shift register 200. Optical outputs from each of the slots 202A–202N are coupled to a corresponding module upon the ring, and optical inputs from each of the slots 202A–202N are received from each corresponding module as well.

In accordance with the above disclosure, a computer system has been shown which employs a hierarchical ring structure for routing transactions between modules. Modules coupled to the same ring may communicate with very low latency. Communications between rings occur using the same protocol as communications upon a ring. Due to the simple routing structure, short ring transit times may be achieved allowing for a high bandwidth, low latency computer system. According to one embodiment, the computer system employs optical interconnect for the rings, further reducing latency and enhancing scalability of the system.

Numerous variations and modifications will become apparent to those skilled in the art once the above disclosure is fully appreciated. It is intended that the following claims be interpreted to embrace all such variations and modifications.

What is claimed is:

1. A computer system comprising:
   a first ring configured to communicate frames among at least two modules coupled to said first ring;
   a second ring; and
   a first bridge module coupled to said first ring and to said second ring, wherein said first bridge module is configured to transmit a first frame received from said first ring to said second ring if a first address within said first frame indicates a destination external to said first ring, and wherein said first bridge module is configured to transmit a second frame received from said second ring upon said first ring if a second address within said second frame indicates one of said at least two modules coupled to said first ring, and wherein said first ring and said second ring both employ a particular protocol for transmitting frames;
   wherein said protocol comprises time division multiplexing in which a first ring transit time corresponding to said first ring is divided into a first plurality of time slots, and wherein each of said first plurality of time slots is statically assigned to an owner, and wherein said owner is either one of said at least two modules or said first bridge module, and wherein said owner of a first one of said first plurality of time slots is configured to allow another module to use said first one of said first plurality of time slots by marking said first one of said first plurality of time slots not owned, and wherein said owner of said first one of said first plurality of time slots is further configured to reclaim said first one of said first plurality of time slots by marking said first one of said first plurality of time slots owned, and wherein only said owner of said first one of said first plurality of time slots is configured to mark said first one of said first plurality of time slots as either owned or not owned, and wherein said owner of said first one of said first plurality of time slots is further configured to reclaim said first one of said first plurality of time slots as owned even if said first one of said first plurality of time slots is transmitting a second frame corresponding to said another module.

2. The computer system as recited in claim 1 wherein said first ring comprises a first optical link coupled between one of said at least two modules and said first bridge module and a second optical link coupled between another one of said at least two modules and said first bridge module.

3. The computer system as recited in claim 2 wherein said second ring comprises a plurality of optical links, and wherein at least one of said plurality of optical links is coupled to said bridge module.

4. The computer system as recited in claim 1 wherein each of said first plurality of time slots is capable of transmitting one frame.

5. The computer system as recited in claim 1 wherein a second ring transit time corresponding to said second ring is divided into a second plurality of time slots, and wherein a length of each of said second plurality of time slots is equal to a length of each of said first plurality of time slots.

6. The computer system as recited in claim 1 wherein said owner of said first one of said first plurality of time slots is configured to use said first one of said first plurality of time slots upon receiving a null frame within said first one of said first plurality of time slots, said null frame inserted in said first one of said first plurality of time slots in response to said owner of said first one of said first plurality of time slots reclaiming said first one of said first plurality of time slots.

7. The computer system as recited in claim 1 wherein a return address within a third frame transmitted within said first one of said first plurality of time slots identifies which module coupled to said first ring is a source of said third frame.

8. A computer system comprising:
   a ring configured to transmit frames between a plurality of modules coupled to said ring, said plurality of modules including a first module;
   wherein a ring transit time corresponding to said ring is divided into a plurality of time slots, and wherein each of said plurality of time slots is capable of carrying a frame, and wherein a first time slot within said plurality of time slots is statically assigned to said first module, and wherein said first module is configured to allow a different one of said plurality of modules to use said first time slot by marking a first frame within said first time slot not owned, and wherein said first module is further configured to reclaim said first time slot by marking a second frame within said first time slot owned, and wherein only said first module is configured to mark frames within said first time slot owned and not owned, and wherein said first module is further configured to reclaim said first time slot by marking a second frame within said first time slot owned even if said second frame corresponds to said different one of said plurality of modules.

9. The computer system as recited in claim 8 wherein said one of said plurality of modules which is a source of said second frame is configured to acknowledge said first module reclaiming said first time slot by transmitting a null frame in said first time slot.

10. The computer system as recited in claim 9 wherein said first module is configured to use said first time slot upon receiving said null frame.

11. The computer system as recited in claim 8 wherein said first frame includes a return address which identifies which one of said plurality of modules is a source of said first frame.

12. A method for using a plurality of time slots on a ring in a computer system, the method comprising:

statically assigning each of said plurality of time slots to an owner module;

marking a first frame within one of said plurality of time slots not owned by an owner module of said one of said plurality of time slots; and marking a second frame within said one of said plurality of time slots owned by said owner module to reclaim said one of said plurality of time slots;

wherein only said owner module is configured to perform said marking said first frame within one of said plurality of time slots not owned by an owner module and said marking a second frame within said one of said plurality of time slots owned by said owner module, and wherein said marking said second frame is performed even if said second frame corresponds to a second module.

13. The method as recited in claim 14 further comprising inserting a null frame in place of said second frame by said second module in response to said marking said second frame.

14. The method as recited in claim 15 further comprising transmitting a third frame within said one of said plurality of time slots by said owner module in response to receiving said null frame.

15. The method as recited in claim 14 further comprising transmitting said second frame in said one of said plurality of time slots by said second module in response to said marking said first frame.

16. The method as recited in claim 14 further comprising dividing a ring transit time into said plurality of time slots.

17. The method as recited in claim 14 wherein said assigning is performed during initialization of said computer system.

* * * * *